(12) United States Patent
Nemoto et al.

(10) Patent No.: US 10,583,823 B2
(45) Date of Patent: Mar. 10, 2020

(54) CONTROL DEVICE AND CONTROL METHOD

(71) Applicant: Robert Bosch GmbH, Stuttgart (DE)

(72) Inventors: Nobuho Nemoto, Kanagawa (JP); Takuya Watanabe, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 27 days.

(21) Appl. No.: 16/065,324

(22) PCT Filed: Nov. 30, 2016

(86) PCT No.: PCT/IB2016/057206
§ 371 (c)(1),
(2) Date: Jun. 22, 2018

(87) PCT Pub. No.: WO2017/118883
PCT Pub. Date: Jul. 13, 2017

(65) Prior Publication Data
US 2018/0362012 A1    Dec. 20, 2018

(30) Foreign Application Priority Data

Dec. 22, 2015 (JP) .................. 2015-250582

(51) Int. Cl.
*B60W 10/18* (2012.01)
*B60W 10/02* (2006.01)
(Continued)

(52) U.S. Cl.
CPC .......... *B60W 10/026* (2013.01); *B60W 10/06* (2013.01); *B60W 10/18* (2013.01);
(Continued)

(58) Field of Classification Search
None
See application file for complete search history.

(56) References Cited

U.S. PATENT DOCUMENTS

| 2014/0011630 A1* | 1/2014 | Takahashi | ........... B60W 10/184 |
| | | | 477/4 |
| 2014/0228170 A1* | 8/2014 | Kato | ............... B60W 10/04 |
| | | | 477/35 |
| 2018/0066753 A1* | 3/2018 | Zhao | ............... B60W 20/14 |

FOREIGN PATENT DOCUMENTS

| JP | 2010151193 | 7/2010 |
| JP | 2015033903 | 2/2015 |
| WO | 2013104641 | 7/2013 |

OTHER PUBLICATIONS

International Search Report for Application No. PCT/IB2016/057206 dated Mar. 14, 2017 (English Translation, 2 pages).

* cited by examiner

*Primary Examiner* — Justin Holmes
(74) *Attorney, Agent, or Firm* — Michael Best & Friedrich LLP

(57) ABSTRACT

The invention has a purpose of improving applicability of a controller and a control method to a vehicle, the controller and the control method executing brake control in which primary information is selectively supplemented by secondary information that is information on an assumed state related to connection and disconnection of a clutch.

A determination section 5A1 and a brake control section 5A4 are provided, the determination section 5A1 determining whether an actual state related to the connection and the disconnection of the clutch matches the assumed state in accordance with a relationship between the secondary information and travel state information indicative of a travel state of the vehicle, and the brake control section 5A4 executing the brake control by using the primary information but not the secondary information in the case where the determination section 5A1 determines that the actual state does not match the assumed state.

10 Claims, 5 Drawing Sheets

(51) Int. Cl.
 *B60W 30/18* (2012.01)
 *B60W 10/06* (2006.01)
(52) U.S. Cl.
 CPC .............. *B60W 30/18027* (2013.01); *B60W 30/18118* (2013.01); *B60T 2201/06* (2013.01); *B60T 2260/08* (2013.01)

CONTROL DEVICE AND CONTROL METHOD

BACKGROUND OF THE INVENTION

The invention relates to a controller a control method for executing break control of a vehicle.

In general, a clutch operation section, such as a clutch pedal, of a vehicle includes a sensor for detecting an operation state of a clutch. This sensor is used to obtain information on an assumed state related to connection and disconnection of the clutch. In brake control of the vehicle, the information on the assumed state is possibly used with primary information only when reliability of the information on the assumed state is high. The reliability of the information on the assumed state can be determined by monitoring motion of an input shaft and motion of an output shaft of the clutch (for example, see PTL 1).

CITATION LIST

Patent Literature

PTL 1: JP-A-2010-151193

SUMMARY OF THE INVENTION

In order to evaluate the reliability of the information on the assumed state related to the connection and the disconnection of the clutch by monitoring the motion of the input shaft and the motion of the output shaft of the clutch, attachment of the sensor to the inside of the vehicle, a design change in the clutch or a peripheral member thereof, and the like occur. As a result, extensive work is generated to realize or add the above-described brake control. In particular, acquisition of the information on the assumed state related to the connection and the disconnection of the clutch and the evaluation of the reliability are conducted to supplement the brake control using the primary information. Thus, it is further desired not to generate the extensive work, for example.

The invention has been made with a problem as described above as the background and therefore has a purpose of improving applicability of a controller and a control method to a vehicle, the controller and the control method executing brake control in which primary information is selectively supplemented by secondary information that is information on an assumed state related to connection and disconnection of a clutch.

A controller according to the invention is a controller that executes brake control on the basis of primary information and secondary information that is selectively defined whether to be used with the primary information and indicates an assumed state related to connection and disconnection of a clutch of a vehicle. The controller includes: a determination section that determines whether an actual state related to the connection and the disconnection of the clutch matches the assumed state at least in accordance with a relationship between the secondary information and travel state information indicative of a travel state of the vehicle; and a brake control section that executes brake control by using the primary information but not the secondary information in the case where the determination section determines that the actual state does not match the assumed state.

A control method according to the invention is a brake control method for executing brake control that is executed on the basis of primary information and secondary information that is selectively defined whether to be used with the primary information and indicates an assumed state related to connection and disconnection of a clutch of a vehicle. The control method includes: determining whether an actual state related to the connection and the disconnection of the clutch matches the assumed state at least in accordance with a relationship between the secondary information and travel state information indicative of a travel state of the vehicle; and executing the brake control by using the primary information but not the secondary information in the case where it is determined that the actual state does not match the assumed state.

In the controller and the control method according to the invention, reliability of the information on the assumed state, which is related to the connection and the disconnection of the clutch, is evaluated in accordance with the relationship between the information indicative of the assumed state related to the connection and the disconnection of the clutch and the travel state information indicative of the travel state of the vehicle. The evaluation of the reliability of the information on the assumed state related to the connection and the disconnection of the clutch can be realized by a method other than a method for monitoring motion of an input shaft and motion an output shaft of the clutch. Therefore, applicability of the controller and the control method for executing the brake control, in which the primary information is selectively supplemented by the secondary information as the information on the assumed state related to the connection and the disconnection of the clutch, to the vehicle is improved.

DETAILED DESCRIPTION

A description will hereinafter be made on a controller and a control method according to the invention by using the drawings. Each of a configuration, an operation, and the like, which will be described below, is merely one example, and each of the controller and the control method according to the invention is not limited to a case with such a configuration, such an operation, and the like.

In addition, in each of the drawings, detailed portions are depicted in an appropriately simplified manner or are not depicted. Furthermore, overlapping descriptions are appropriately simplified or are not made.

Embodiment

<Overall Configuration of a Vehicle Control System 200>

Figure 1:
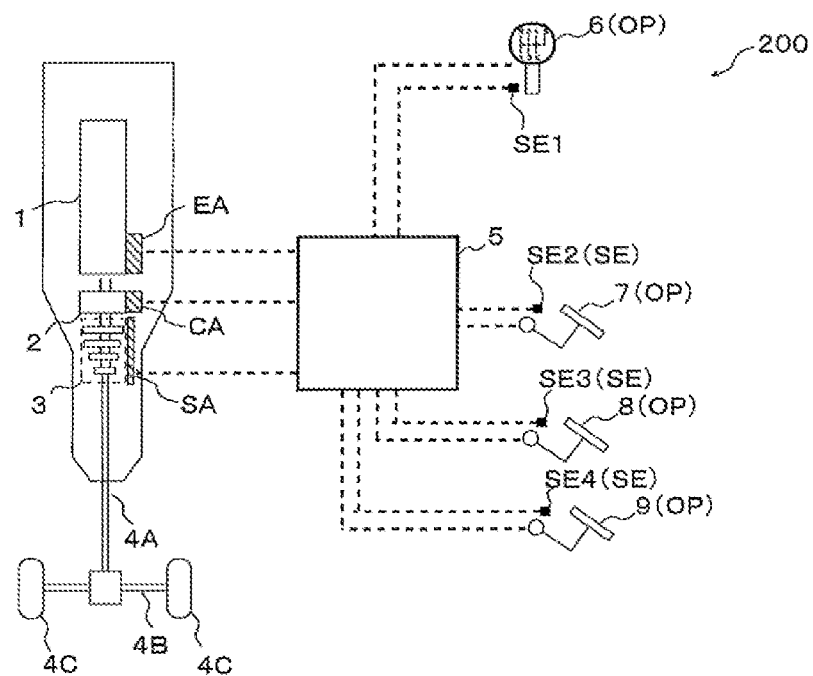
FIG. 1 is a schematic configuration diagram of a vehicle control system that includes a controller according to an embodiment of the invention.
Figure 2:
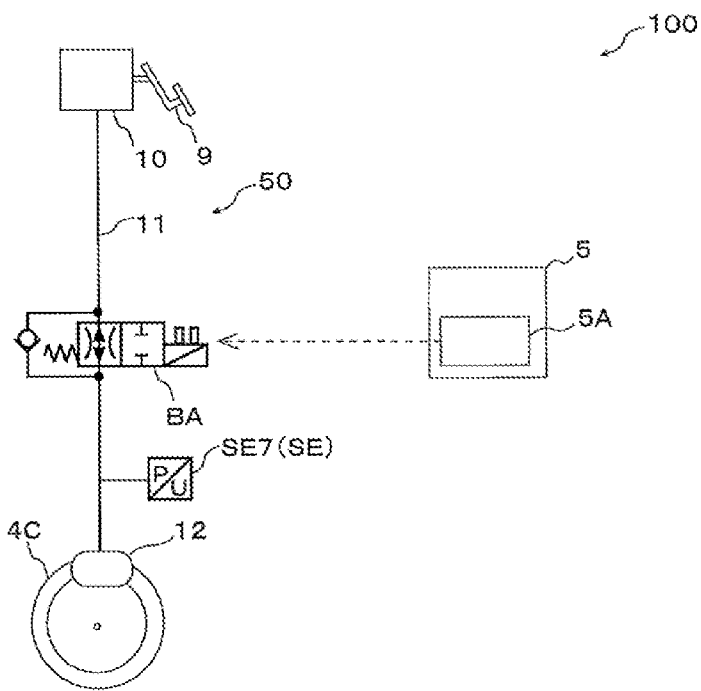
FIG. 2 is a schematic configuration diagram of a hydraulic pressure control system in the vehicle control system that includes the controller according to the embodiment of the invention.

FIG. 1 is a schematic configuration diagram of a vehicle control system 200 that includes a controller 100 according to this embodiment. FIG. 2 is a schematic configuration diagram of a hydraulic pressure control system 50 in the vehicle control system 200 that includes the controller 100 according to this embodiment.

The vehicle control system 200 includes the controller 100 that is mounted in a vehicle such as an automobile, a truck, a motorcycle, or the like. In this embodiment, a description will be made on a case where the vehicle is a four-wheeled vehicle as one example. The vehicle includes, for example, a propeller shaft 4A that is connected to a transmission 3, a drive shaft 4B to which rotary power is transmitted from the propeller shaft 4A, and wheels 4C that are connected to the drive shaft 4B.

The vehicle control system 200 includes: an engine 1 that generates power; a clutch 2 that switches between a state where the power generated in the engine 1 is transmitted to the transmission 3 (a connected state) and a state where the power generated in the engine 1 is not transmitted to the transmission 3 (a disconnected state); the transmission 3 that includes plural gears; and the hydraulic pressure control system 50 that generates a brake force.

The vehicle control system 200 also includes: a power unit EA that is used for motion of the engine 1; a clutch actuator CA that is used for motion of the clutch 2; a shift actuator SA that is used for motion of the transmission 3; and a brake actuator BA that is used to control a hydraulic pressure of a hydraulic circuit in the hydraulic pressure control system 50.

The power unit EA includes a configuration of operating the engine 1 that includes a fuel igniter, a fuel injection valve, a throttle valve, and the like, for example. Switching between the connection and the disconnection of the clutch 2 is controlled when motion of the clutch actuator CA is controlled. Gear changing of the transmission 3 is controlled when motion of the shift actuator SA is controlled. A hydraulic pressure of a wheel cylinder 12 that is provided in the wheel 4C is controlled when the brake actuator BA is opened/closed. Note that the brake actuator BA is an electromagnetic valve that includes a solenoid, for example.

The vehicle control system 200 includes an operation section OP that is operated by an occupant or the like. The operation section OP includes: a shift change lever 6 that is operated when the gear of the transmission 3 is changed; a clutch pedal 7 that is operated when the connection and the disconnection of the clutch 2 is switched; an accelerator pedal 8 that is operated when the engine 1 is driven; and a brake pedal 9 that is operated when the brake force is generated in the vehicle.

The vehicle control system 200 also includes the hydraulic pressure control system 50 depicted in FIG. 2. Note that the hydraulic circuit of the hydraulic pressure control system 50 is depicted in a simplified manner in FIG. 2. The hydraulic pressure control system 50 includes: a brake device 10 that is constructed of a booster, a master cylinder, and the like; a fluid pipe 11 that is connected to the master cylinder of the brake device 10; the brake actuator BA that is connected to the fluid pipe 11; and the wheel cylinder 12 that is attached to the wheel 4C and is connected to the fluid pipe 11. Note that the brake pedal 9 is coupled to the booster of the brake device 10.

The vehicle control system 200 includes a control section 5 that controls the power unit EA, the clutch actuator CA, the shift actuator SA, and the brake actuator BA.

The vehicle control system 200 further includes a detection mechanism SE that includes a detection switch for detecting motion (a position) of the operation section OP and the like. As depicted in FIG. 1, the detection mechanism SE includes: a position detection sensor SE1 that detects a position of the shift change lever 6; a position detection sensor SE2 that detects a position of the clutch pedal 7; a position detection sensor SE3 that detects a position of the accelerator pedal 8; a position detection sensor SE4 that detects a position of the brake pedal 9; and a pressure sensor SE7 that detects a hydraulic pressure of the wheel cylinder 12.

The detection mechanism SE also includes: an acceleration sensor SE5 (see FIG. 3) that is used to compute acceleration of the vehicle; and a wheel speed sensor SE6 (see FIG. 3) that is used to compute a wheel speed of the vehicle.

<Description on a Configuration of the Controller 100>

Figure 3:
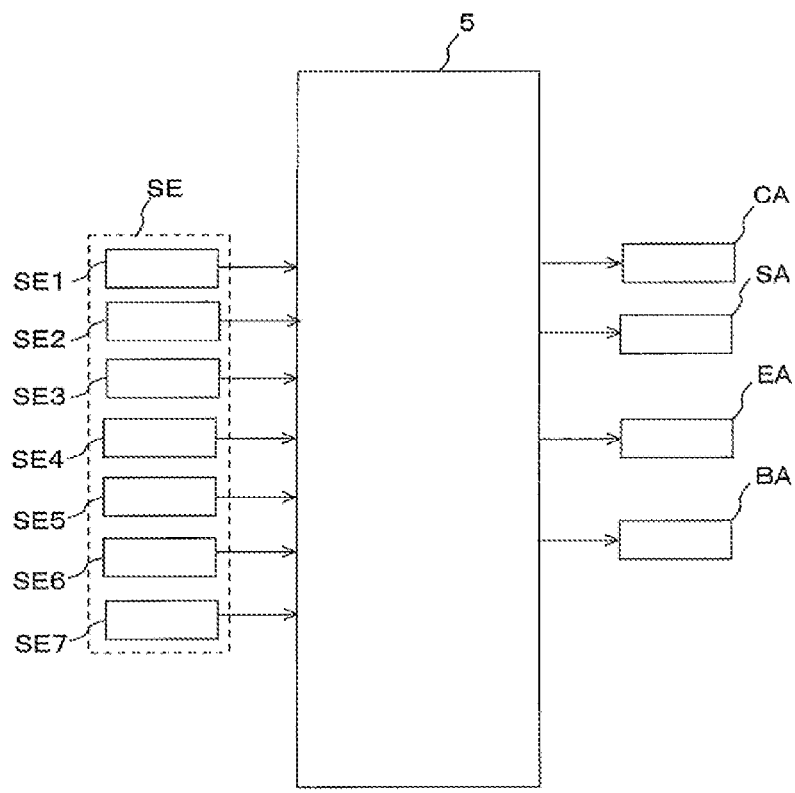
FIG. 3 is a functional block diagram of various sensors, a control section, and various actuators provided in the vehicle control system that includes the controller according to the embodiment of the invention.
Figure 4:
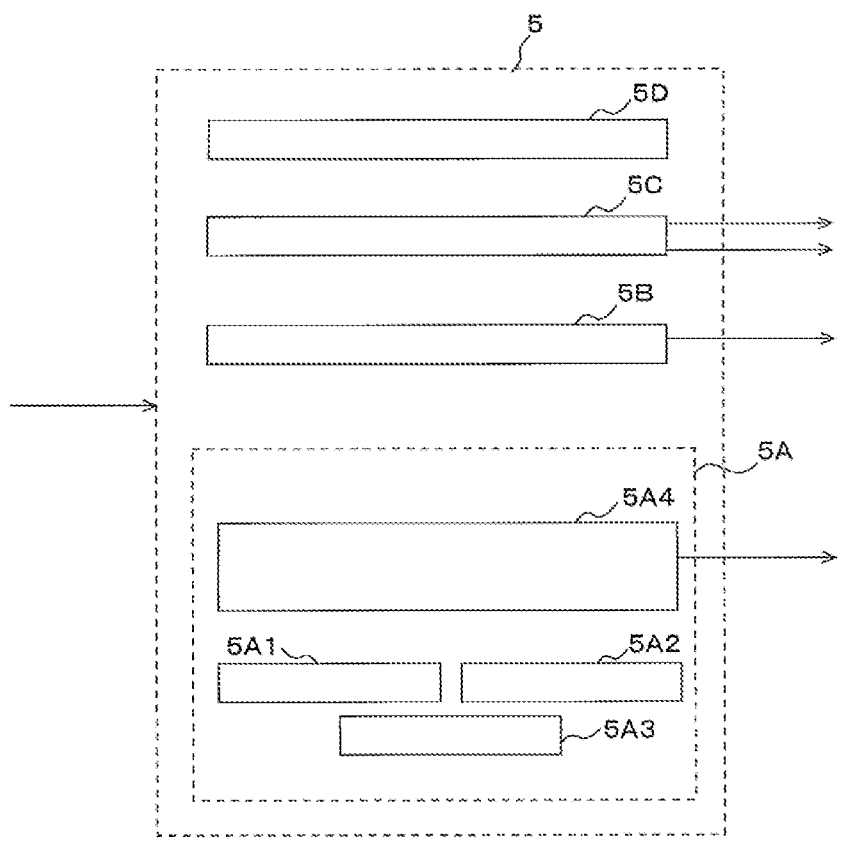
FIG. 4 is a functional block diagram of a control section of the controller according to the embodiment of the invention.

FIG. 3 is a functional block diagram of the various sensors, the control section 5, and the various actuators provided in the vehicle control system 200 that includes the controller 100 according to this embodiment. FIG. 4 is a functional block diagram of the control section 5 of the controller 100 according to this embodiment. A description will be made on a configuration example of the control section 5 with reference to FIG. 3 and FIG. 4.

The controller 100 at least includes the hydraulic control system 50 and a brake control section 5A of the control section 5, which will be described below. Note that the controller 100 may include the detection mechanism SE and the like.

The control section 5 includes: the brake control section 5A that controls the brake actuator BA on the basis of a detection signal of the detection mechanism SE; an engine control section 5B that controls the power unit EA in accordance with a depression amount of the accelerator pedal 8 that corresponds to a detection signal of the position detection sensor SE3; a transmission control section 5C that controls the clutch actuator CA and the shift actuator SA on the basis of the detection signal of the detection mechanism SE; and a memory section 5D that stores various types of information. Note that the memory section 5D can be constructed of a random access memory (a RAM) and the like, for example.

A part or a whole of the control section 5 may be constructed of a microcomputer, a microprocessor unit, or the like, may be constructed of a member in which firmware and the like can be updated, or may be a program module or the like that is executed by a command from a CPU or the like, for example.

The brake control section 5A includes a determination section 5A1 that makes a determination on whether the clutch 2 is connected and the like; a timer section 5A2 that counts time; and a computation section 5A3 that computes a vehicle speed from the wheel speed sensor SE6 and the like. The brake control section 5A also includes a brake control section 5A4 that controls the brake actuator BA.

The brake control section 5A executes brake control that is executed on the basis of primary information and secondary information that is selectively defined whether it is used with the primary information and that indicates an assumed state related on the connection and the disconnection of the clutch 2 in the vehicle. The determination section 5A1 determines whether an actual state related to the connection and the disconnection of the clutch 2 matches the assumed state at least in accordance with a relationship between the secondary information and travel state information that indicates a travel state of the vehicle.

Here, the primary information is information that is output through an operation of the accelerator pedal 8 and is processed by the determination section 5A1, for example. Information on the position detection sensor SE3, which is provided on the accelerator pedal 8, corresponds to the primary information. The secondary information is information that indicates the connected state of the clutch 2, for example. Information on the position detection sensor SE2, which is provided on the clutch pedal 7, corresponds to the secondary information. Furthermore, the travel state information is information that indicates a travel state of the vehicle and is also information that is processed by the determination section 5A1. Speed information of the vehicle, gear position information indicative of a gear position of the vehicle, and acceleration information of the vehicle correspond to the travel state information.

First, a description will be made on the determination that corresponds to the relationship and is made by the determination section 5A1.

The determination section 5A1 determines whether the clutch 2 is connected on the basis of a detection signal of the position detection sensor SE2, which is provided in the clutch 2. In addition, the determination section 5A1 determines whether the vehicle is stopped on the basis of the vehicle speed that is computed by the computation section 5A3. Furthermore, the determination section 5A1 determines whether the gear is at a position other than neutral on the basis of a detection signal of the position detection sensor SE1, which is provided in the shift change lever 6. On the basis of these three determination results, the determination section 5A1 determines whether the assumed state related to the connection and the disconnection of the clutch 2 matches the actual state related to the connection and the disconnection of the clutch 2.

Note that the assumed state indicates the connected state of the clutch 2 that is estimated on the basis of the detection signal of the detection mechanism SE. Meanwhile, the actual state does not indicate the state that is estimated on the basis of the detection signal of the detection mechanism SE but indicates an actually connected state of the clutch 2.

A situation where (1) the clutch 2 is in the connected state, (2) the vehicle is stopped, and (3) the gear is at the position other than neutral is a situation that is unlikely to be assumed in reality. It is because there is a contradiction between a situation where output of the engine 1 is transmitted to the wheel 4C and the vehicle is supposed to move due to facts the gear is at the position other than neutral and that the clutch 2 is connected and a situation where the vehicle is stopped. Accordingly, at least one of (1) to (3) is possibly incorrect.

Here, compared to a detection signal of the wheel speed sensor SE6 that is used for the determination on whether the vehicle is stopped and the detection signal of the position detection sensor SE1 that is used for the determination on whether the gear is at the position other than neutral, the detection signal of the position detection sensor SE2 that is used for the determination on whether the clutch 2 is connected is often low in reliability. It is because a relationship between a depression amount of the clutch pedal 7 and a sensed position by the position detection sensor SE2 is not changed or the like while the depression amount of the clutch pedal 7 at a time when the clutch 2 is actually connected is possibly changed due to wear of the clutch 2, for example. Accordingly, it can be estimated that (1) is incorrect and (2) and (3) are correct.

Thus, on the basis of the above-described three determination results, the determination section 5A1 can determine that the assumed state does not match the actual state. In addition, because the reliability of the information on the operation state of the clutch 2 is low, the determination section 5A1 sets a flag F. When the flag F is set, the secondary information is not used in the brake control.

The determination section 5A1 determines whether the acceleration of the vehicle is at least equal to prescribed acceleration on the basis of the acceleration that is computed by the computation section 5A3 from a detection signal of the acceleration sensor SE5. The determination section 5A1 can also determine whether the assumed state related to the connection and the disconnection of the clutch 2 matches the actual state related to the connection and the disconnection of the clutch 2 on the basis of the above-described determination on whether the clutch 2 is connected and the determination on whether the acceleration of this vehicle is at least equal to the prescribed acceleration.

A situation where (4) the clutch 2 is in the disconnected state and (5) the acceleration of the vehicle is at least equal to the prescribed acceleration is unlikely to be established in reality. It is because, while the acceleration of the vehicle is at least equal to the prescribed acceleration that cannot be obtained without using the output of the engine 1, the clutch 2 is disconnected, and the output of the engine 1 is not transmitted to the wheels 4C. Note that there is a case where the acceleration of the vehicle is increased to some extent even when the clutch 2 is disconnected, like a case where the vehicle uses its own weight to travel on an inclined road surface. Accordingly, the prescribed acceleration is preferably set to be higher than the acceleration that is generated during such a travel.

Compared to the detection signal of the acceleration sensor SE5 that is used for the determination on whether the acceleration of the vehicle is at least equal to the prescribed acceleration, the detection signal of the position detection sensor SE2 that is used for the determination on whether the clutch 2 is connected is often low in reliability. Thus, it can be estimated that (4) is incorrect and (5) is correct. Accordingly, the determination section 5A1 determines that the assumed state does not match the actual state, and sets the flag F.

Here, such a condition that a state of being at least equal to the prescribed acceleration continues for a prescribed time or longer is desirably added to make the determination on whether the acceleration of the vehicle is at least equal to the prescribed acceleration. In other words, the determination section 5A1 determines whether the acceleration of the vehicle is at least equal to the prescribed acceleration for the prescribed time or longer on the basis of the acceleration that is computed by the computation section 5A3 and output of the timer section 5A2. In this way, the determination section 5A1 can avoid to make such a determination that the acceleration of the vehicle is at least equal to the prescribed acceleration even when noise is superposed on output of the acceleration sensor SE5, for example. In addition, the prescribed time is set as a time that is sufficiently longer than a time required for the vehicle to make a typical travel on a slope. In this way, it can be suppressed from making a wrong determination that the assumed state does not match the actual state in the case where the vehicle uses its own weight to travel on the inclined road surface.

The control section 5 executes hill-hold control as the brake control under a certain condition. The hill-hold control refers to control in which the brake force of the vehicle is retained for a certain time even when the occupant of the vehicle releases the brake pedal 9 in a state where the vehicle is stopped on the inclined road surface. Here, the hill-hold control includes a retention mode and a cancellation mode. The retention mode is a mode in which the brake force of the vehicle is retained. The cancellation mode is a mode in which the retention of the brake force in the retention mode is cancelled and the brake force is reduced. Thus, timing at which the brake force, which has been retained in the hill-hold control, starts to be reduced is shift timing from the retention mode to the cancellation mode.

The hill-hold control as the brake control is executed on the basis of the primary information and the secondary information that is selectively defined whether to be used with the primary information and that indicates the assumed state related to the connection and the disconnection of the clutch 2 of the vehicle. In the hill-hold control, whether to use the secondary information is defined in accordance with whether the flag F is set.

The determination section 5A1 determines whether an inclination value of the road surface that is computed by the computation section 5A3 is larger than a prescribed value, determines whether the vehicle is stopped, and determines whether the brake pedal 9 is released. When determining that the inclination value of the road surface that is computed by the computation section 5A3 is larger than the prescribed value, determining that the vehicle is stopped, and determining that the brake pedal 9 is released, the determination section 5A1 determines to execute the retention mode of the hill-hold control. Here, the inclination value of the road surface can be computed on the basis of the detection signal of the acceleration sensor SE5, the detection signal of the wheel speed sensor SE6 can be used for the speed of the vehicle, and the detection signal of the position detection sensor SE4 can be used for an operation state of the brake pedal 9.

In the case where the retention mode is executed, the determination section 5A1 determines whether the accelerator pedal 8 is operated, determines whether the above-described flag F is set, and determines whether the clutch pedal 7 is operated. In this way, it is determined whether to shift to the cancellation mode even before a lapse of a certain time period since initiation of the retention mode.

In the case where the cancellation mode is executed, the determination section 5A1 determines whether the pressure of the wheel cylinder 12 that is computed by the computation section 5A3 is lower than a prescribed pressure. Said determination is used to obtain timing for terminating the cancellation mode.

The timer section 5A2 counts a period from the initiation of the retention mode until a lapse of the certain time, a period from the time, at which it is determined that the acceleration of the vehicle is at least equal to the prescribed acceleration, until the lapse of the prescribed time, and the like, for example.

The computation section 5A3 computes the wheel speed on the basis of the detection signal of the wheel speed sensor SE6. The computation section 5A3 also computes the inclination value of the road surface on the basis of the detection signal of the acceleration sensor SE5. The computation section 5A3 further computes the pressure of the wheel cylinder 12 on the basis of a detection signal of the pressure sensor SE7.

The brake control section 5A4 controls the opening/closing operations of the brake actuator BA and the like.

<A Control Flow Example of Reliability Evaluation of the Secondary Information>

Figure 5:
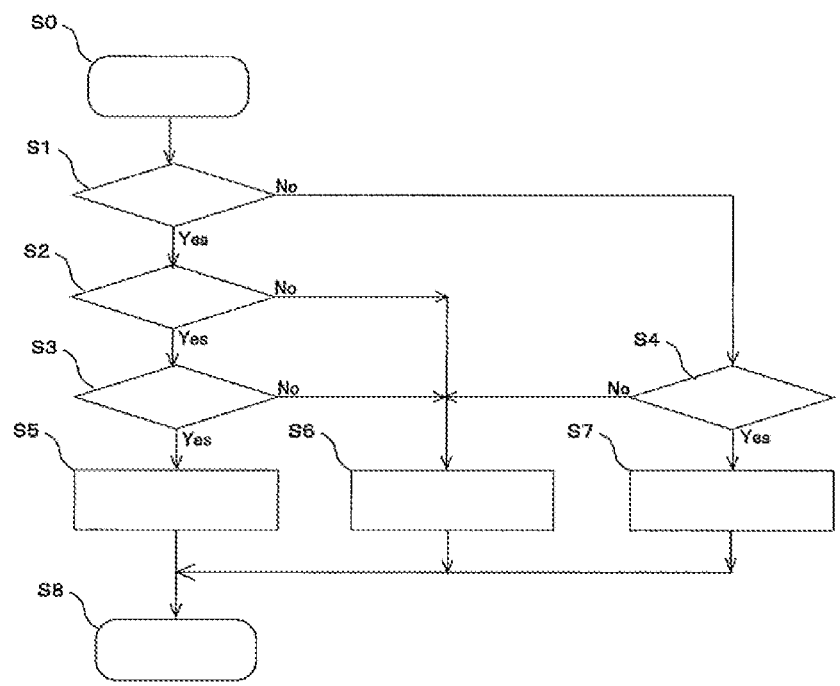
FIG. 5 is one example of a control flow for evaluating reliability of secondary information (a determination result of a connection state of a clutch) on the controller according to the embodiment of the invention.

FIG. 5 is one example of a control flow for evaluating the reliability of the secondary information (the determination result of the connected state of the clutch 2) of the controller 100 according to this embodiment.

(Step S0: Start)

The control section 5 executes the control flow for evaluating the reliability of the secondary information.

(Step S1: Determination Related to Connection of Clutch 2)

The determination section 5A1 of the controller 5 determines whether the clutch 2 is connected on the basis of the detection signal of the position detection sensor SE2 as the secondary information.

If it is determined that the clutch 2 is connected, the process proceeds to step S2.

If it is not determined that the clutch 2 is connected, the process proceeds to step S4.

(Step S2: Determination Related to Stop of Vehicle)

The determination section 5A1 of the control section 5 determines whether the vehicle is stopped on the basis of the vehicle speed that is computed by the computation section 5A3 from the detection signal of the wheel speed sensor SE6 as the travel state information.

If it is determined that the vehicle is stopped, the process proceeds to step S3.

If it is not determined that the vehicle is stopped, the process proceeds to step S6.

(Step S3: Determination Related to Gear of Vehicle)

The determination section 5A1 of the controller 5 determines whether the gear is at the position other than neutral on the basis of the detection signal of the position detection sensor SE1 as the travel state information.

If it is determined that the gear is at the position other than neutral, the process proceeds to step S5.

If it is not determined that the gear is at the position other than neutral, the process proceeds to step S6.

(Step S4: Determination Related to Acceleration of Vehicle)

The control section 5 determines whether the acceleration of the vehicle is at least equal to the prescribed acceleration for the prescribed time or longer on the basis of the output of the timer section 5A2 and the acceleration that is computed by the computation section 5A3 from the detection signal of the acceleration sensor SE5 as the travel state information.

If it is determined that the acceleration is at least equal to the prescribed acceleration for the prescribed time or longer, the process proceeds to step S7.

If it is not determined that the acceleration is at least equal to the prescribed acceleration for the prescribed time or longer, the process proceeds to step S6.

(Step S5 and Step S7: Flag F is Set)

When the process proceeds to step S5 or step S7, the actual state of the clutch 2 does not match the assumed state thereof, and the reliability of the secondary information is low. Thus, the control section 5 sets the flag F.

(Step S6: Flag F is Not Set)

The control section 5 does not set the flag F.

(Step S8: End)

The control section 5 terminates the control flow for evaluating the reliability of the secondary information.

<Control Flow Example of the Brake Control by the Control Section 5>

Figure 6:
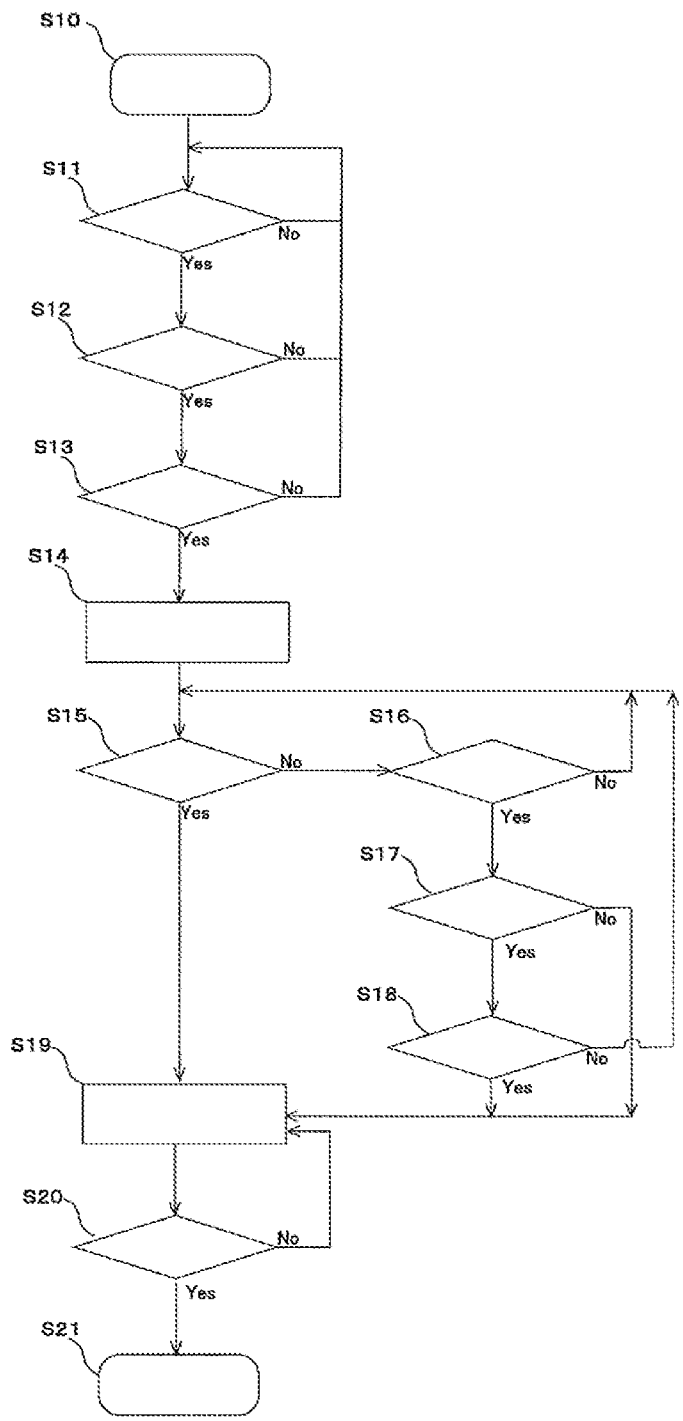
FIG. 6 is one example of a control flow of brake control by the controller according to the embodiment of the invention.

FIG. 6 is one example of a control flow of the brake control by the controller 100 according to this embodiment.

A description will be made on the hill-hold control that is executed by the control section 5 of the controller 100 with reference to FIG. 6.

(Step S10: Start)

The control section 5 executes the control flow that includes the hill-hold control.

(Step S11: Determination Related to Inclination)

The determination section 5A1 of the control section 5 determines whether the vehicle is on the inclined road surface on the basis of the inclination value that is computed by the computation section 5A3 from the detection signal of the acceleration sensor SE5.

If it is determined that the vehicle is on the inclined road surface, the process proceeds to step S12.

If it is determined that the vehicle is not on the inclined road surface, step S11 is repeated.

(Step S12: Determination Related to Stop of Vehicle)

The determination section 5A1 of the control section 5 determines whether the vehicle is stopped on the basis of the wheel speed that is computed by the computation section 5A3.

If it is determined that the vehicle is stopped, the process proceeds to step S13.

If it is determined that the vehicle is not stopped, the process returns to step S11.

(Step S13: Determination Related to Brake Pedal 9)

The determination section 5A1 of the control section 5 determines whether the brake pedal 9 is released on the basis of the detection signal of the position detection sensor SE4.

If it is determined that the brake pedal 9 is released, the process proceeds to step S14.

If it is determined that the brake pedal 9 is not released, the process returns to step S11.

(Step S14: Execution of Retention Mode of Hill-Hold Control)

The control section 5 executes the retention mode of the hill-hold control. The control section 5 closes the brake actuator BA for a certain time so as to retain the brake force of the vehicle.

(Step S15: Determination Related to Time Since Initiation of Retention Mode)

The determination section 5A1 of the control section 5 determines whether the certain time has elapsed since the initiation of the retention mode on the basis of the signal from the timer section 5A2.

If it is determined that the certain time has elapsed, the process proceeds to step S19.

If it is not determined that the certain time has elapsed, the process proceeds to step S16.

(Step S16: Determination Related to Accelerator Pedal 8)

The determination section 5A1 of the control section 5 determines whether the accelerator pedal 8 is depressed on the basis of the detection signal of the position detection sensor SE3 as the primary information.

If it is determined that the accelerator pedal 8 is depressed, the process proceeds to step S17.

If it is not determined that the accelerator pedal 8 is depressed, the process returns to step S15.

(Step S17: Determination Related to Flag F)

The determination section 5A1 of the control section 5 determines whether the flag F is unset.

If it is determined that the flag F is unset, the process proceeds to step S18 due to the reliability of the detection signal of the position detection sensor SE2 as the secondary information.

If it is not determined that the flag F is unset, the process proceeds to step S19 due to the low reliability of detection signal of the position detection sensor SE2 as the secondary information. That is, regardless of the detection signal of the position detection sensor SE2, the process proceeds to step S19, and the control section 5 executes the cancellation mode.

(Step S18: Determination Related to Clutch Pedal 7)

The determination section 5A1 of the control section 5 determines whether the clutch pedal 7 is depressed on the basis of the detection signal of the position detection sensor SE2 as the secondary information.

If it is determined that the clutch pedal 7 is depressed, the process proceeds to step S19.

If it is not determined that the clutch pedal 7 is depressed, the process returns to step S15.

(Step S19: Execution of Cancellation Mode of Hill-Hold Control)

The control section 5 executes the cancellation mode of the hill-hold control. The brake control section 5A4 of the control section 5 controls the brake actuator BA so as to reduce the brake force.

(Step S20: Determination Related to Cylinder Pressure)

The determination section 5A1 of the control section 5 determines whether the pressure of the wheel cylinder 12 is lower than the prescribed pressure.

If it is determined that the pressure is lower than the prescribed pressure, the process proceeds to step S21.

If it is determined that the pressure is not lower than the prescribed pressure, the process returns to step S19.

(Step S21: End)

The control section 5 terminates the control flow that includes the hill-hold control.

<Effects that the Controller 100 According to this Embodiment has>

The controller 100 according to this embodiment includes: the determination section 5A1 that determines whether the actual state and the assumed state related to the connection and the disconnection of the clutch 2 match each other at least in accordance with the relationship between the secondary information and the travel state information indicative of the travel state of the vehicle; and the brake control section 5A4 that executes the brake control by using the primary information but not the secondary information in the case where the determination section 5A1 determines that the actual state does not match the assumed state. The secondary information that is used to determine whether the actual state matches the assumed state is not limited to information from a sensor, such as the conventional controller, that detects rotation of the input shaft and the output shaft of the clutch 2, or the like. Thus, applicability of the controller to the vehicle is improved.

For example, the determination section 5A1 determines that the actual state does not match the assumed state in the cases where the secondary information is the information indicative of the connected state of the clutch 2, the travel state information is the information indicative of a stopped state of the vehicle, and the gear position information indicative of the gear position of the vehicle is information indicative of the position other than neutral. In addition, the determination section 5A1 determines that the actual state does not match the assumed state, for example, in the cases where the secondary information is information indicative of the disconnected state of the clutch 2 and the travel state information is the information indicating that the acceleration of the vehicle is at least equal to the prescribed acceleration.

Compared to the information indicative of the stopped state of the vehicle, and the like, the reliability of the information indicative of the connected state or the disconnected state of the clutch 2 is low. Accordingly, when these conditions are satisfied, it is determined that the actual state does not match the assumed state. Thus, the reliability of the secondary information can be evaluated with high accuracy.

Preferably, the primer information is the information that is output through an operation of an accelerator (for example, corresponding to the accelerator pedal 8) and is processed by the determination section 5A1 (for example, corresponding to the detection signal of the position detection sensor SE3), and the brake control is control in which a hill-hold function for retaining the brake force generated in the vehicle on the inclined road surface is canceled (corresponding to step S19 in FIG. 6). In other words, when the determination section 5A1 determines that the actual state does not match the assumed state, the hill-hold function is canceled by using the primary information, which corresponds to the detection signal of the position detection sensor SE3 provided on the accelerator pedal 8, but not the secondary information.

For example, there is a case where the actual state indicates the connection of the clutch 2 but the assumed state indicates the disconnection of the clutch 2 when the occupant operates the clutch pedal 7. When it is assumed that step S17 depicted in FIG. 6 is not provided, the occupant operates the clutch pedal 7, and the process proceeds from step S16 to step S18. At this time, the assumed state of the clutch 2 is the disconnected state. Thus, despite a fact that the clutch 2 is actually connected, the process returns from step S18 to step S15. Then, a loop from step S15 to step S18 cannot be broken until the certain time elapses in step S15, and the occupant cannot start the vehicle smoothly. The controller 100 according to this embodiment sets the flag F so as to refrain from use of the secondary information in advance when determining that the actual state does not match the assumed state. Thus, the process can proceed from step S17 to step S19 before a lapse of the certain time in step S15. Therefore, the occupant can start the vehicle smoothly.

REFERENCE SIGNS LIST

1: Engine
2: Clutch
3: Transmission
4A: Propeller shaft
4B: Drive shaft
4C: Wheel
5: Control section
5A: Brake control section
5A1: Determination section
5A2: Timer section
5A3: Computation section
5A4: Brake control section
5B: Engine control section
5C: Transmission control section
5D: Memory section
6: Shift change lever
7: Clutch pedal
8: Accelerator pedal
9: Brake pedal
10: Brake device
11: Fluid pipe
12: Wheel cylinder
50: Hydraulic pressure control system
100: Controller
200: Vehicle control system
BA: Brake actuator
CA: Clutch actuator
EA: Power unit
OP: Operation section
SA: Shift actuator
SE: Detection mechanism
SE1 to SE4: Position detection sensor
SE5: Acceleration sensor
SE6: Wheel speed sensor
SE7: Pressure sensor

The invention claimed is:

1. A controller for executing brake control that is executed on the basis of primary information and secondary information that is selectively defined whether to be used with the primary information and indicates an assumed state related to connection and disconnection of a clutch of a vehicle, the controller comprising:
a determiner that determines whether an actual state related to the connection and the disconnection of the clutch matches an assumed state at least in accordance with a relationship between the secondary information and travel state information indicative of a travel state of the vehicle; and
a brake controller that executes the brake control by using the primary information but not the secondary information in the case where the determiner determines that the actual state does not match the assumed state;
wherein the determiner determines that the actual state does not match the assumed state in cases where the secondary information is information indicative of a connected state of the clutch, the travel state information is information indicative of a stopped state of the vehicle, and gear position information indicative of a gear position of the vehicle is information indicative of a position other than neutral.

2. The controller according to claim 1, wherein
the secondary information is information that is output through an operation of the clutch and is processed by the determiner.

3. The controller according to claim 1, wherein
the determiner determines that the actual state does not match the assumed state in cases where the secondary information is information indicative of a disconnected state of the clutch and the travel state information is information indicating that an acceleration of the vehicle is at least equal to a prescribed acceleration.

4. The controller according to claim 3, wherein
the travel state information in the case where the determiner determines that the actual state does not match the assumed state is information indicating that the acceleration of the vehicle is at least equal to the prescribed acceleration for a prescribed time or longer.

5. The controller according to claim 1, wherein
the primary information is information that is output through an operation of an accelerator and is processed by the determiner, and
the brake control is a control that cancels a hill-hold function for retaining a brake force generated in the vehicle on an inclined road surface.

6. A control method for executing brake control that is executed on the basis of: primary information; and secondary information that is selectively defined whether to be used with the primary information and indicates an assumed state related to connection and disconnection of a clutch of a vehicle, the control method comprising:
determining whether an actual state related to the connection and the disconnection of the clutch matches the assumed state at least in accordance with a relationship between the secondary information and travel state information indicative of a travel state of the vehicle; and executing the brake control by using the primary information but not the secondary information in the case where it is determined that the actual state does not match the assumed state;

wherein the determiner determines that the actual state does not match the assumed state in cases where the secondary information is information indicative of a connected state of the clutch, the travel state information is information indicative of a stopped state of the vehicle, and gear position information indicative of a gear position of the vehicle is information indicative of a position other than neutral.

7. A controller for executing brake control that is executed on the basis of primary information and secondary information that is selectively defined whether to be used with the primary information and indicates an assumed state related to connection and disconnection of a clutch of a vehicle, the controller comprising:

a determiner that determines whether an actual state related to the connection and the disconnection of the clutch matches an assumed state at least in accordance with a relationship between the secondary information and travel state information indicative of a travel state of the vehicle; and a brake controller that executes the brake control by using the primary information but not the secondary information in the case where the determiner determines that the actual state does not match the assumed state, wherein the determiner determines that the actual state does not match the assumed state in cases where the secondary information is information indicative of a disconnected state of the clutch and the travel state information is information indicating that an acceleration of the vehicle is at least equal to a prescribed acceleration.

8. A controller for executing brake control that is executed on the basis of primary information and secondary information that is selectively defined whether to be used with the primary information and indicates an assumed state related to connection and disconnection of a clutch of a vehicle, the controller comprising:

a determiner that determines whether an actual state related to the connection and the disconnection of the clutch matches an assumed state at least in accordance with a relationship between the secondary information and travel state information indicative of a travel state of the vehicle; and a brake controller that executes the brake control by using the primary information but not the secondary information in the case where the determiner determines that the actual state does not match the assumed state;

wherein the primary information is information that is output through an operation of an accelerator and is processed by the determiner, and the brake control is a control that cancels a hill-hold function for retaining a brake force generated in the vehicle on an inclined road surface.

9. A control method for executing brake control that is executed on the basis of: primary information; and secondary information that is selectively defined whether to be used with the primary information and indicates an assumed state related to connection and disconnection of a clutch of a vehicle, the control method comprising:

determining whether an actual state related to the connection and the disconnection of the clutch matches the assumed state at least in accordance with a relationship between the secondary information and travel state information indicative of a travel state of the vehicle; and executing the brake control by using the primary information but not the secondary information in the case where it is determined that the actual state does not match the assumed state;

wherein the determiner determines that the actual state does not match the assumed state in cases where the secondary information is information indicative of a disconnected state of the clutch and the travel state information is information indicating that an acceleration of the vehicle is at least equal to a prescribed acceleration.

10. A control method for executing brake control that is executed on the basis of:

primary information; and secondary information that is selectively defined whether to be used with the primary information and indicates an assumed state related to connection and disconnection of a clutch of a vehicle, the control method comprising:

determining whether an actual state related to the connection and the disconnection of the clutch matches the assumed state at least in accordance with a relationship between the secondary information and travel state information indicative of a travel state of the vehicle; and executing the brake control by using the primary information but not the secondary information in the case where it is determined that the actual state does not match the assumed state;

wherein the primary information is information that is output through an operation of an accelerator and is processed by the determiner, and the brake control is a control that cancels a hill-hold function for retaining a brake force generated in the vehicle on an inclined road surface.

* * * * *